United States Patent [19]

Farronato et al.

[11] Patent Number: 5,110,846
[45] Date of Patent: May 5, 1992

[54] PROCESS FOR CONTINUOUS PRODUCTION OF MATT OR SATIN POWDER PAINTS

[75] Inventors: Silvestro Farronato; Sergio Gazzea, both of Romano d'Ezzelino, Italy

[73] Assignee: Hoechst Sara S.p.A., Romano D'Ezzelino, Italy

[21] Appl. No.: 449,904

[22] PCT Filed: Apr. 21, 1989

[86] PCT No.: PCT/EP89/00432
§ 371 Date: Dec. 15, 1989
§ 102(e) Date: Dec. 15, 1989

[87] PCT Pub. No.: WO89/10949
PCT Pub. Date: Nov. 16, 1989

[30] Foreign Application Priority Data
May 2, 1988 [IT] Italy .................. 20421 A/88

[51] Int. Cl.$^5$ .................. C08K 13/00; C08J 3/20; B29C 47/60; A01J 21/02
[52] U.S. Cl. .................. 523/346; 523/351; 523/353; 264/211.23; 425/381.2
[58] Field of Search .................. 523/346, 351, 353; 264/211.23; 425/381.2

[56] References Cited

U.S. PATENT DOCUMENTS 2,540,146  2/1951  Stober .................. 523/351
4,405,547  9/1983  Koch et al. .................. 264/211.23

FOREIGN PATENT DOCUMENTS 0214448  3/1987  European Pat. Off.

Primary Examiner—Paul R. Michl
Assistant Examiner—Patrick Niland
Attorney, Agent, or Firm—Darby & Darby

[57] ABSTRACT

The method consists of the separate simultaneous extrusion, by means of two or more contiguous extruders or one extruder with two or more separate homogenization chambers, of two or more paints in powder form and the union of the extrusions in the molten state or still hot and then subsequent cooling as a single extrusion.

5 Claims, No Drawings

PROCESS FOR CONTINUOUS PRODUCTION OF MATT OR SATIN POWDER PAINTS

BACKGROUND OF THE INVENTION

Various methods are currently used to obtain matt or satin powder paints but, to a greater or lesser extent, all of them have limitations.

Some methods have recourse to overpigmentation or the addition of polymers which are incompatible with the binder system in intimate homogenization but this leads to a diminution in the chemical and mechanical resistance of the paints.

Other methods use intimate homogenization of additives or special catalysts which, however, can only be used with specific systems of binders.

Other methods, always with intimate homogenization, are based on the difference in reactivity between resins of the same type of reactive group in a single binder system.

Still other methods do not use intimate homogenization but cold physical mixing of one or more paints extruded separately and with different viscosity or reactivity or systems of binders as described in international patent application PCT/EP 89/00022 in the name of the same applicant, published under number WO 89/06674.

These last methods are much less limiting than the preceding ones because they can employ practically all the systems of binders as long as they have different viscosities or different types of cross linking. However they are less practical because, with cold mixing methods, manufactures of powder paints normally extrude the paints separately, cool the extrusions, crush or grind them, sieve them and then weigh them out in the various pre-established ratios and mix them in a mixing machine. This means that the process is discontinuous and thus more time, space, materials and manpower are required.

There is also the danger of partial separation of the two paints during the various stages of grinding and sieving because of the difference in their specific weights or a different conformation of the granules of powder. Finally, at the spraying stage, the two paints can be deposited non-uniformly because of the different charges accumulated by the two binders.

SUMMARY OF THE INVENTION

According to this invention, surprisingly it has been found that there is no need to cool the extruded paints separately and then cold mix them, working discontinuously, but, as long as there is no intimate homogenization, they can be put together or roughly mixed in the molten state or still hot in the pre-established ratios and then cooled, crushed etc. as if they came from a single extrusion.

Therefore, according to this invention, two or more extruders side by side or one extruder with two or more separate homogenization chambers and a single output nozzle can be used, regulating the inflow ratio to comply with the pre-established ratio. The paints extruded separately still in the molten state or hot from the nozzles of the extruders or the intimate homogenization chambers are put in contact with one another and then drawn through a single calender or cooling body as if they were a single extrusion.

The advantage of this invention is obvious since the regulation of the ratio of the input into the homogenization chambers eliminates the need to weigh the paints and there is no longer any need for a mixer because the paints are put into contact before they are cooled.

DETAILED DESCRIPTION OF THE PREFERRED EMBODIMENTS

This invention will be more clearly understood from an examination of the following descriptive and non-limiting examples of the scope of the invention.

Description of the polymers and additives used in the illustrative examples of the invention:

ALFTALAT 01844

Experimental polyester resin with hydroxyl end radicals.
Hydroxyl number = 30 mg KOH/g resin
Viscosity at 200° C. C&P = 4500-600 mPa.s
Glass transition temperature $T_g = 50°$ C.

ADDITOL XL 432

Blocked aliphatic isocyanic prepolymer produced and marketed by Hoechst.
Total contents of NCO = 9.50%.

ADDITOL XL 496

Masterbatch—spreading additive marketed by Hoechst, containing 15% of active substance.

ALFTALAT 01918

Experimental polyester resin with hydroxyl end radicals.
Hydroxyl number = 100 mg KOH/g resin
Viscosity at 200° C. C&P = 4000-6000 mPa.s.
$T_g$ = approx 57° C.

BECKOPOX EH 694

Polyanhydride, produced and marketed by Hoechst.
Acid value = 260-280 mg KOH/g
Melting point = approx 60° C.

ALFTALAT AN 721

Polyester resin with carboxyl end radicals—produced and marketed by Hoechst.
Acid value: 35-45 mg KOH/g.
Viscosity at 200° C. C&P = 4000-6000 mPa.s.
$T_g$ = approx 52° C.

ARALDIT PT 810

Triglycidyl isocyanuratete (TGIC) produced and marketed by CIBA-GEIGY.

EXAMPLE I

Paint A (aliphatic polyurethane paint) composed of:

| | |
|---|---|
| ALFATALAT 01844 | 500 |
| ADDITOL XL 432 | 110 |
| ADDITOL XL 496 | 30 |
| BENZOIN | 5 |
| TITANIUM DIOXIDE (rutile) | 345 |
| | 1000 parts | dry mixed in a mixer and then homogenized in an extruder at 90°-100° C. and cooled, crushed, ground and sieved through a 110 micron sieve. The powder obtained in this way was sprayed onto a sheet with a spraygun for electrostatic painting at a voltage of approx. 60 KV at 30-60 microns of thickness and hardened in a oven for 30 minutes at a temperature of 180°

C., providing an elastic film with good chemical and mechanical resistance, good adherence to the support and a brilliance of 90 gloss, determined with a glossmeter at an angle of incidence of 60°.

Composition B (polyanhydride hydroxylated paint) composed of:

| ALFTALAT 01918 | 456 |
|---|---|
| BECKOPOX EH 694 | 164 |
| ADDITOL XL 496 | 30 |
| BENZOIN | 5 |
| TITANIUM DIOXIDE | 345 |
| | 1000 parts | treated in the same way as composition A, producing a film with good mechanical resistance and a brilliance of 92 gloss.

Various ratios of paints obtained from compositions A and B were weighed and then the ratios were cold mixed. These mixtures were then applied to a Unichim sheet and baked under the same conditions used for the paint from composition A, producing films with good chemical and mechanical resistance with the gloss values shown in table I.

TABLE I

| Ratios Part A/Part B | Gloss 60° |
|---|---|
| 20/80 | 43 |
| 30/70 | 23 |
| 50/50 | 7 |
| 60/40 | 19 |
| 70/30 | 41 |
| 80/20 | 69 |

In conformity with the present invention, two extruders were placed side by side, one was loaded with the A composition and the second with the B composition.

Extrusion was then started simultaneously, regulating the delivery of the extruded material to the same value. The extruded material exiting from the nozzles was still hot and was mixed together and then conveyed to the cooling calender.

The extrusion obtained in this way was cooled, crushed, ground and sieved through a 100 micron sieve.

This powder paint obtained in conformity with the invention of the hot union of paints A and B, applied and baked in the same conditions used for paint A, produced a film with a gloss of 7, thus with exactly the same value as that obtained with a 50/50 ratio of the cold mixture of Table I.

Separate and simultaneous extrusion of paints A and B in conformity with the invention was then repeated, varying the delivery ratios of the two extruders in order to obtain as output from the nozzles a union of the hot extrusions in the ratios shown in table I.

The gloss values of the paint films produced in this way are identical to those of table I.

EXAMPLE 2

| Composition A (anhydride hydroxylated paint) composed of: | |
|---|---|
| ALFTALAT 01918 | 456 |
| BECKOPOX EH 644 | 164 |
| ADDITOL XL 496 | 30 |
| BENZOIN | 5 |
| TITANIUM DIOXIDE | 345 |

-continued
EXAMPLE 2

| Composition B (glycidylic carboxylicated paint) composed of: | 1000 parts |
|---|---|
| ALFTALAT AN 721 | 574 |
| ARALDIT PT 810 | 45 |
| ADDITOL XL 496 | 30 |
| BENZOIN | 4 |
| BLANC FIXE | 47 |
| TITANIUM DIOXIDE | 300 |
| | 1000 parts |

Compositions A and B were extruded separately in the conditions of example 1A, and the resulting paints were applied and baked in the same way, producing a 92 gloss film for A and an 89 gloss for B.

In conformity with the invention, two extruders were positioned facing one another with the nozzles almost touching so that the molten material which was extruded combined together and dropped together into a cooling calender.

Composition A was loaded into one extruder and composition B into the other. The two paints were then extruded simultaneously and the delivery ratio of the two extruders was varied to obtain combinations of different ratios of the molten paints.

After cooling, the paints were flaked, ground, sieved and a layer of 30-40 microns was applied to the sheet and then baked for 30 minutes at 180° C.

The gloss values of the paints obtained in this way are given in table 2.

TABLE 2

| Ratios Part A/Part B | Gloss 60° |
|---|---|
| 90/10 | 73 |
| 80/20 | 43 |
| 70/30 | 32 |
| 60/40 | 23 |
| 50/50 | 22 |
| 40/60 | 23 |
| 30/70 | 34 |
| 20/80 | 44 |

We claim:

1. A method of continuous production of a matt or satin powder paint comprising a physical mixture of a plurality of powder paints wherein said powder paints are different from each other in at least one of their respective viscosities, reactivities, and systems of binders, said method comprising the steps of extruding separately each of the plurality of paints and physically combining the extruded paints in their molten state in a single stream before cooling in a predetermined variable ratio to produce desired matt or satin powder paint.

2. A method as set forth in claim 1 further including the step of cooling the stream of combined separately extruded paints.

3. A method as set forth in claim 1 wherein said extruding step includes extruding the plurality of paints in a plurality of contiguous extruders.

4. A method as set forth in claim 1 wherein said extruding step includes extruding the plurality of paints in a single extruder having a respective plurality of separate extrusion chambers.

5. A method as set forth in claim 1 wherein said extruding step includes providing a single extruder having a respective plurality of feeders and respective homogenization chambers and a single outlet nozzle.

* * * * *